UNITED STATES PATENT OFFICE.

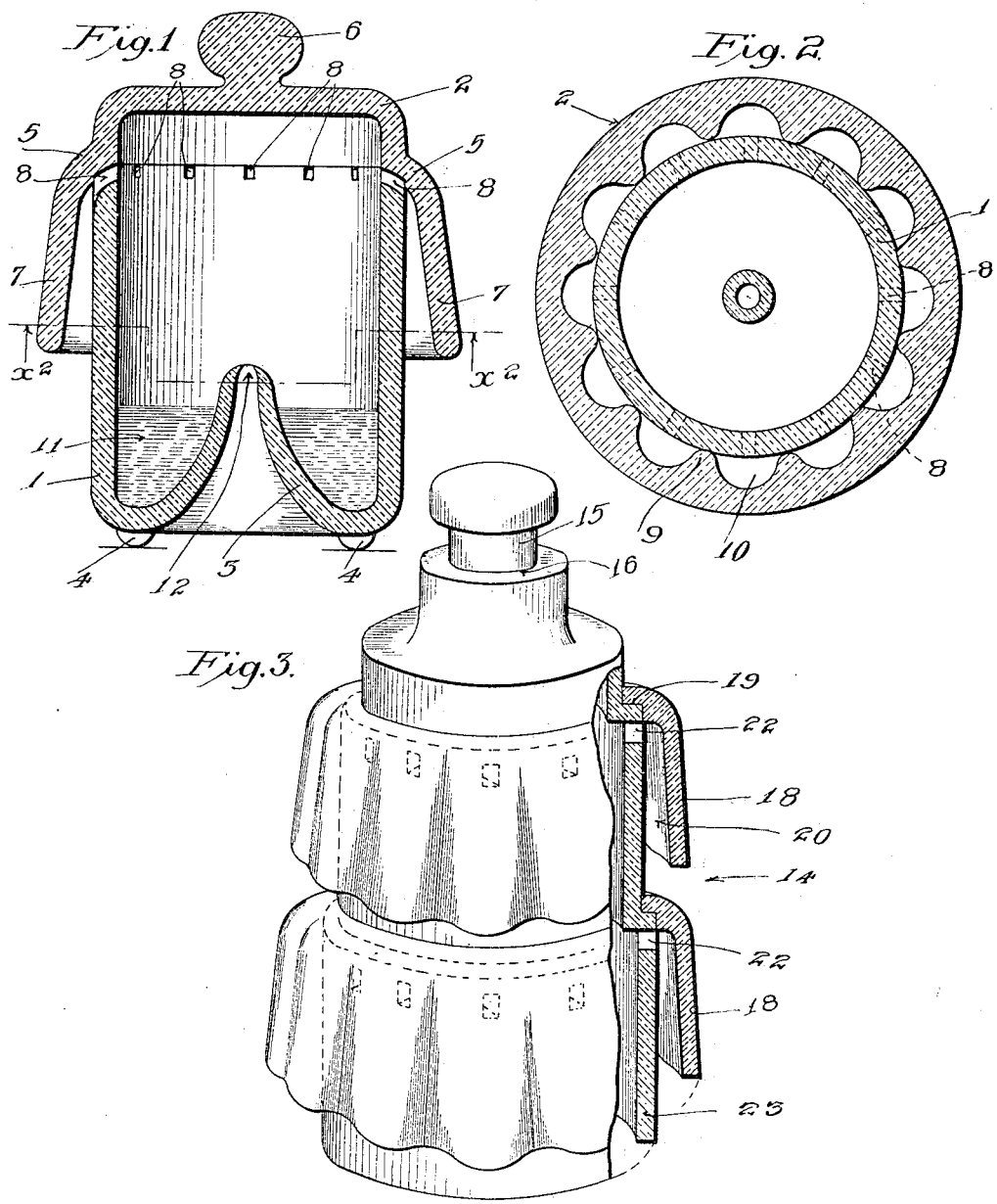

GUY O. WALTERS, OF LONGBEACH, CALIFORNIA.

FLY-TRAP.

1,091,550.

Specification of Letters Patent. Patented Mar. 31, 1914.

Application filed May 21, 1913. Serial No. 769,071.

*To all whom it may concern:*

Be it known that I, GUY O. WALTERS, a citizen of the United States, residing at Longbeach, in the county of Los Angeles and State of California, have invented a new and useful Fly-Trap, of which the following is a specification.

The main object of the invention is to provide a fly trap which will be sanitary, easily cleaned, and having large trapping capacity.

Other objects of the invention will appear hereinafter.

The accompanying drawings illustrate embodiments of the invention, and referring thereto:

Figure 1 is a vertical section of one form of my improved fly trap. Fig. 2 is a section on line $x^2$—$x^2$ in Fig. 1, looking upwardly. Fig. 3 is a side elevation of another form of my improved fly trap.

Referring to Figs. 1 and 2, the fly trap shown therein comprises a receptacle 1 in the form of a cup and a cover member 2 for said receptacle. The bottom of said receptacle is formed with an upwardly extending hollow cone 3, open at its lower and upper ends, so as to provide communication from the space beneath the receptacle 1 to the interior of said receptacle, said receptacle being provided on its bottom with lugs or projections 4 for supporting it in elevated position to enable flies or insects to pass beneath the receptacle and into said hollow cone.

The cover member 2 is formed with a shoulder 5 resting on the upper end or edge of the side walls of the cup shaped receptacle 1 and is preferably provided with a handle or knob 6 to facilitate placing it in position on, or removing it from, the receptacle 1. Said cover member is further provided with an apron or skirt 7 which extends obliquely downward beyond said shoulder, forming an annular deflector for guiding the flies or insects as hereinafter set forth. At any suitable point or points in the walls of said receptacle 1 are provided inlets 8 to enable the flies or insects to pass from the space or spaces within the apron 7 to the interior of said receptacle 1, said inlets 8 being formed, for example, as grooves or channels in the upper edge of the walls of the receptacle 1, said channels being covered at the top by the shoulder 5 of the cover member when the latter is in place. Said channels preferably incline inwardly and upwardly to facilitate the passage of flies into the interior of the receptacle. The apron 7 may be provided with inwardly extending projections or ribs 9 dividing the space between said deflector and receptacle 1 into vertically extending channels 10 which are open at their lower ends and which lead at their upper ends to the respective channels 8.

The operation is as follows: Liquid, such as sweetened water, is placed in the space 11 around the hollow cone 3 at the bottom of the receptacle and the cover member 2 is put in place. Flies which pass beneath the receptacle and upwardly into the hollow cone 3, pass through the outlet 12 at the top of said cone to the interior of the receptacle 1, and flies which alight on the outside of the receptacle 1, pass up the vertical wall thereof and into the channels 10 and through the channels 8 to the interior of the receptacle. On account of the small size of the inlets 12 and 8 and of their upward and inward direction, the flies are not liable to pass out through the same when they have once entered the trap and are sooner or later caught in the water or liquid in the bottom of the receptacle 1.

The device is readily cleaned by removing the cover member, leaving all parts free for cleaning purposes.

In place of the construction shown in Figs. 1 and 2, the receptacle indicated at 14 in Fig. 3, may be provided with a cover member 15 for closing an opening 16 at the top of the receptacle 14 and with one or more aprons or frusto conical annular deflectors 18 surrounding the receptacle 14 and resting on bridges or shoulders 19 on said receptacle, channels or passages 20 being provided through the walls of said receptacle to establish communication from the space within said annular deflectors to the center of the receptacle. Said receptacle 14 is provided at its bottom with a hollow cone 23 opening at its upper end as shown at 22 into the interior of the receptacle. The operation of this form of my invention is substantially the same as above described in connection with Figs. 1 and 2.

What I claim is:

1. A fly trap comprising a cup shaped receptacle having in its bottom a hollow cone, open at the bottom and communicating at its upper end with the interior of the receptacle, the walls of said receptacle being provided with channels, an annular deflector extending around the receptacle and provided with inwardly projecting ribs, forming vertically extending channels for directing insects to said channels in the walls of the receptacle, and a removable cover member for said receptacle.

2. A fly trap comprising a cup shaped receptacle having in its bottom a hollow cone, open at the bottom and communicating at its upper end with the interior of the receptacle, the walls of said receptacle being provided with channels, an annular deflector extending around the receptacle for directing insects to said channels in the walls of the receptacle, and a removable cover member for said receptacle, said annular deflector being formed on said removable cover.

3. A fly trap comprising a cup shaped receptacle having in its bottom a hollow cone, open at the bottom and communicating at its upper end with the interior of the receptacle, the walls of said receptacle being provided with channels, an annular deflector extending around the receptacle for directing insects to said channels in the walls of the receptacle, and a removable cover member for said receptacle, said annular deflector being formed on said removable cover member, and said removable cover member resting on the top of the side wall of said cup shaped receptacle.

4. A fly trap comprising a cup shaped receptacle having in its bottom a hollow cone, open at the bottom and communicating at its upper end with the interior of the receptacle, the walls of said receptacle being provided with channels, an annular deflector extending around the receptacle for directing insects to said channels in the walls of the receptacle, and a removable cover member for said receptacle, said annular deflector being formed on said removable cover member, said channels being formed in the upper end of the side wall of said cup shaped receptacle, and said removable cover member resting on top of said side wall and extending over said channels.

In testimony whereof, I have hereunto set my hand at Los Angeles, California, this 14 day of May 1913.

GUY O. WALTERS.

In presence of—
 MARTHA M. LANGE,
 LORA M. BOWERS.

---

Copies of this patent may be obtained for five cents each, by addressing the "Commissioner of Patents, Washington, D. C."